US009454527B2

(12) United States Patent
Marsh

(10) Patent No.: US 9,454,527 B2
(45) Date of Patent: Sep. 27, 2016

(54) METHOD AND COMPUTER-READABLE MEDIA FOR CREATING VERIFIED BUSINESS TRANSACTION DOCUMENTS

(76) Inventor: Robert E. Marsh, Kansas City, MO (US)

(*) Notice: Subject to any disclaimer, the term of this patent is extended or adjusted under 35 U.S.C. 154(b) by 1407 days.

(21) Appl. No.: 12/151,706

(22) Filed: May 8, 2008

(65) Prior Publication Data

US 2008/0313186 A1 Dec. 18, 2008

Related U.S. Application Data

(60) Provisional application No. 60/928,905, filed on May 11, 2007.

(51) Int. Cl.
*G06F 17/30* (2006.01)
(52) U.S. Cl.
CPC ... *G06F 17/30011* (2013.01); *G06F 17/30008* (2013.01); *G06F 17/30286* (2013.01)
(58) Field of Classification Search
CPC .................. G06F 17/30011; G06F 17/30286; G06F 17/30008
See application file for complete search history.

(56) References Cited

U.S. PATENT DOCUMENTS

| | | | | |
|---|---|---|---|---|
| 6,154,753 | A  * | 11/2000 | McFarland | 715/221 |
| 7,212,322 | B2 * | 5/2007 | Abhyankar et al. | 358/527 |
| 7,672,003 | B2 * | 3/2010 | Dowling et al. | 358/1.15 |
| 2002/0107768 | A1 | 8/2002 | Davis et al. | |
| 2002/0129056 | A1 * | 9/2002 | Conant et al. | 707/511 |
| 2003/0078801 | A1 * | 4/2003 | Cope | 705/1 |
| 2003/0172343 | A1 * | 9/2003 | Leymaster et al. | 715/500 |
| 2007/0192275 | A1 * | 8/2007 | Foygel et al. | 707/1 |
| 2007/0220068 | A1 * | 9/2007 | Thompson et al. | 707/203 |
| 2007/0260648 | A1 * | 11/2007 | Friesenhahn et al. | 707/203 |
| 2008/0005667 | A1 * | 1/2008 | Dias et al. | 715/523 |
| 2008/0104408 | A1 * | 5/2008 | Mayer | 713/178 |
| 2009/0192978 | A1 * | 7/2009 | Hewett et al. | 707/1 |

* cited by examiner

*Primary Examiner* — Rehana Perveen
*Assistant Examiner* — Raheem Hoffler
(74) *Attorney, Agent, or Firm* — Hovey Williams LLP

(57) ABSTRACT

A method, and computer-readable media for performing the method, for creating verified business transaction documents. Electronic transaction documents are received from authenticated users, version identifiers are assigned to these documents, and the documents and version identifiers are stored in a database. Authenticated users may select a single version for "finalization" and a non-alterable document with a verification code is created and stored in the database for retrieval by users.

17 Claims, 3 Drawing Sheets

METHOD AND COMPUTER-READABLE MEDIA FOR CREATING VERIFIED BUSINESS TRANSACTION DOCUMENTS

RELATED APPLICATIONS

This nonprovisional patent application claims priority benefit, with regard to all common subject matter, of earlier-filed U.S. provisional patent application titled "Document Exchange Version Identifier", Ser. No. 60/928,905, filed May 11, 2007. The identified earlier-filed application is hereby incorporated by reference in its entirety into the present application.

BACKGROUND OF THE INVENTION

Various on-line collaboration systems are used to facilitate the exchange of business transaction documents via secure Internet websites. These systems are particularly useful in situations in which multiple versions of a document are exchanged among multiple users. Ideally the versions of different documents are presented in an organized manner allowing retrieval of both current and prior versions of each of the documents involved.

In many cases these documents are exchanged in an environment involving multiple "adverse" parties on different sides of a transaction. For example, document drafts may be exchanged between a buyer and seller of a business (and their attorneys and advisers). In the situations it is desirable that the document repository be a neutral service not associated with either of the transaction parties.

But despite the efficient use of Internet-based document exchange systems, the final step in most significant transactions is still the physical signing of the documents. In the case of significant transactions, dozens of documents, many of which may be 50 or more pages in length, must be signed at the "closing." In some cases there is not a single closing and instead each party prints the "final" document and signature pages are exchanged. While an on-line document exchange system allows the parties to more efficiently reach the point of agreement upon a "final" version that will be signed by the parties, there remains some uncertainty as to whether the printed document being signed at the closing (or separately printed and signed by each of the parties) is the "final" document expected by the parties. Unfortunately, the only way to accurately verify the appropriateness of the printed document presented for signature is to physically compare that document with a printed version of the intended "final" version. This process is time-consuming and prone to error, particularly in complex transactions with multiple lengthy documents.

SUMMARY OF THE INVENTION

The present invention addresses these issues with an on-line system of exchanging transaction documents by providing a new method of creating a verified transaction document. In this invention, a document exchange system functions as a neutral repository of all document drafts exchanged by the parties. If in a transaction twenty versions of a particular agreement were exchanged, each of these twenty versions is available for retrieval. Related information such as the sequence of receipt of document versions and the identity of the person providing each document version are also presented. As a final step, this invention allows the parties to designate a single version (typically the most recent version) of the document as the "final" version. The "final" document is converted to a non-alterable format (such as Adobe Acrobat PDF) and a verification code is added to the document. For example, the verification code may be added as a "footer" to the "final" version. This verification code may constitute symbols, text, or other identifying information and it may be located anywhere on or in the document. This modified, non-alterable document is automatically added to the versions available in the document exchange system database. Optionally, the document exchange system may preclude the submission of future drafts after such a "final" document has been generated.

The parties preparing to complete a transaction may open and print the final version with the verification code and text included. The parties signing the documents can look for the verification code and confirm that an incorrect version was not inadvertently printed. Ideally the verification code would appear on each page of the printed final document. While there is some remaining risk of fraudulent document alteration, the verification code and accompanying text (which could include graphical elements) could be sufficiently difficult to accurately copy it would require a substantial amount of dishonest effort. In such a case other remedies would be available against a dishonest party.

BRIEF DESCRIPTION OF THE DRAWINGS

This invention is described in detail below with reference to the attached drawing figures.

DETAILED DESCRIPTION OF THE INVENTION

This invention is comprised of the method described in more detail below. The invention also comprises one or more computer-readable media having computer-executable instructions embodied thereon and associated processors and memory for performing this method. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
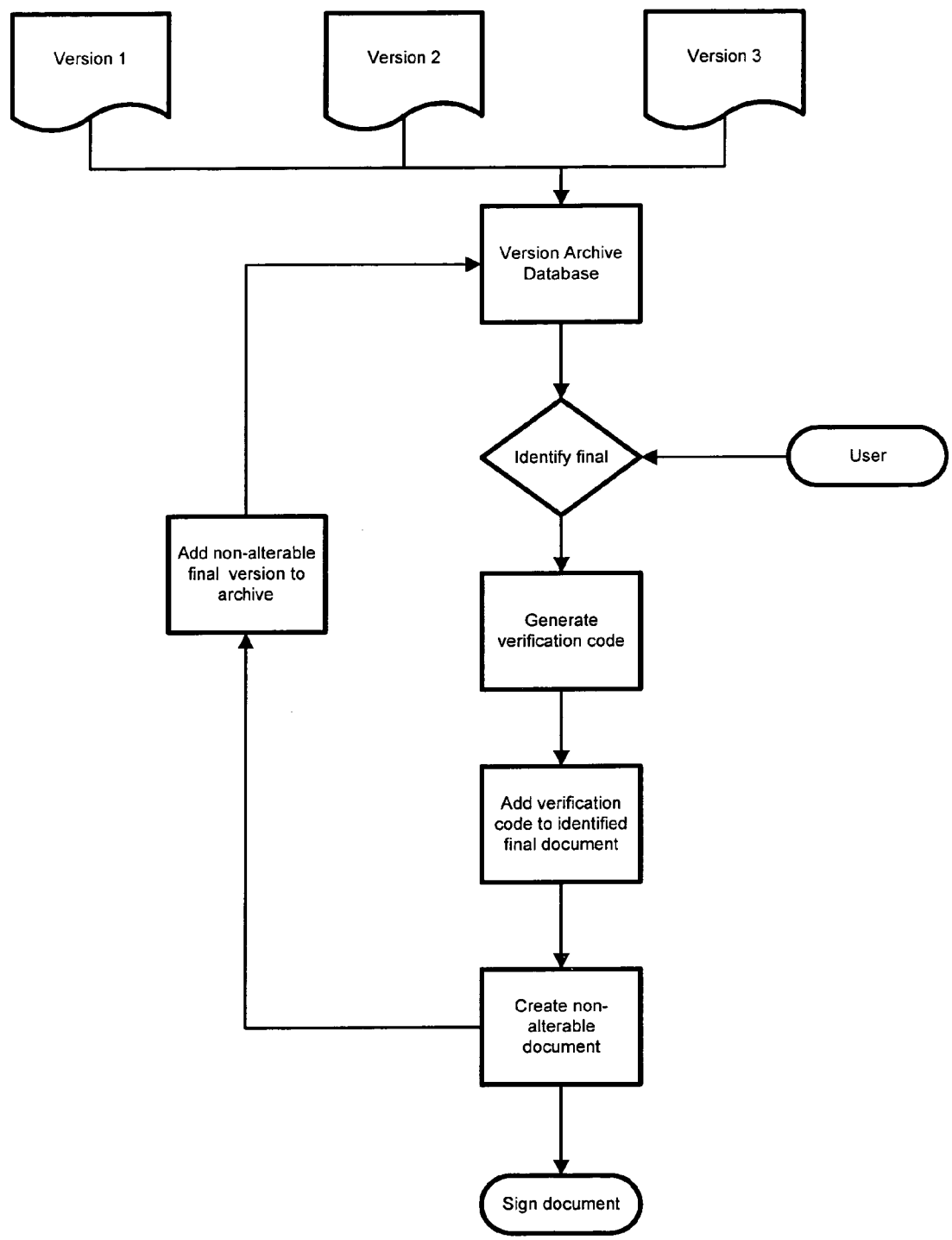
FIG. 1 is a flowchart showing certain steps of the present invention.

FIG. 1 shows in general the collection of multiple business transaction document versions in a version archive for exchanging business transaction documents. To facilitate the negotiation process, the document versions exchanged would typically be in a format that can be easily modified, such as a Microsoft Word format. When a "final" version is identified, a verification code is generated and added to the identified "final" document. Ideally at this point the document is converted to a "non-alterable" format (like Adobe Acrobat PDF). This non-alterable version is added to the database for access by users, who can then print and sign the document.

Figure 2:
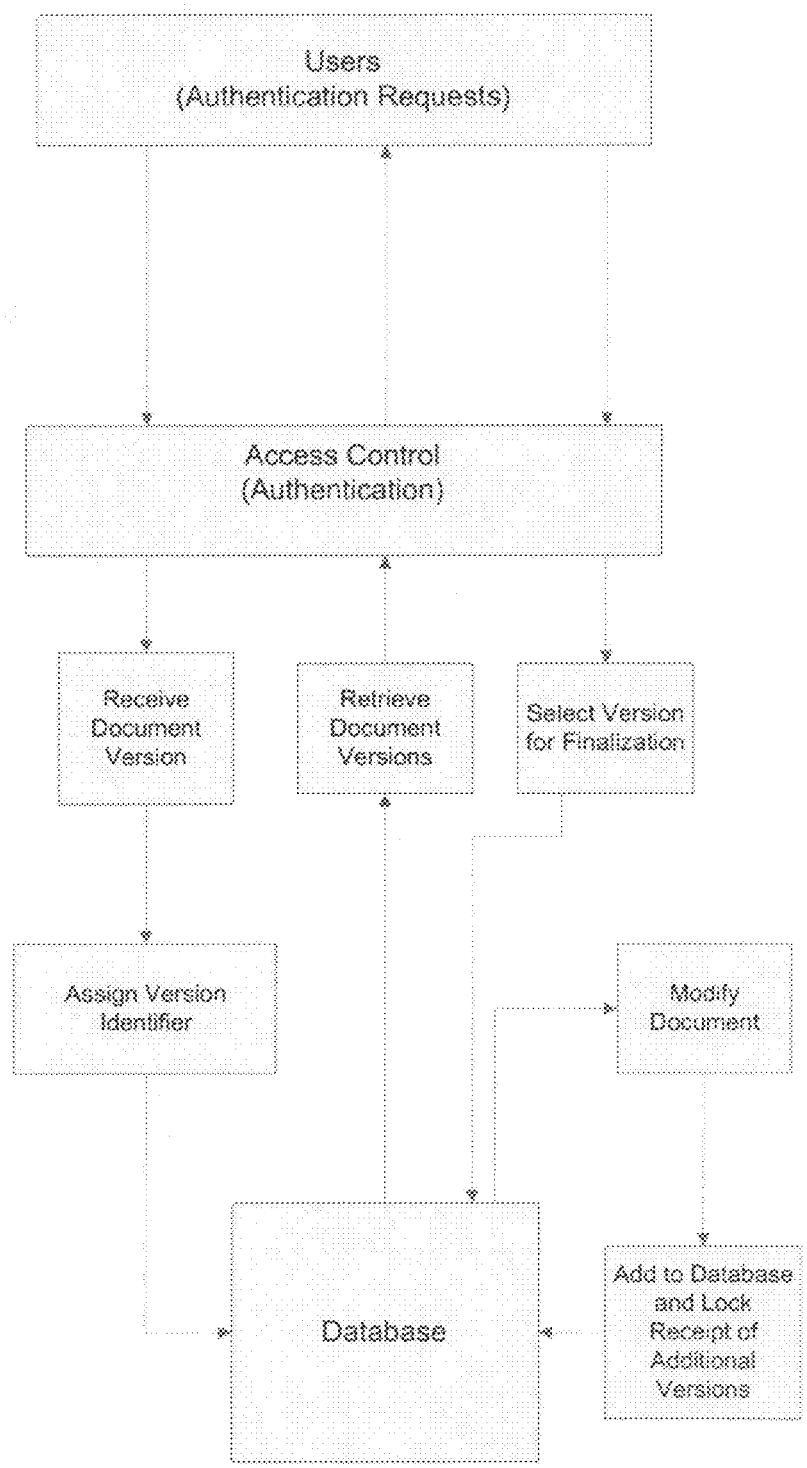
FIG. 2 is a block diagram showing key method steps and elements of a preferred embodiment of the present invention.

FIG. 2 identifies more specifically steps of the method (and computer-readable media) that constitute this invention. In a preferred embodiment of the invention application software (created, for example, using ColdFusion 8) is installed on a computer with an operating system software (such as, for example, Windows 2003 server). The process begins with a user providing an authentication request. The application software authenticates users seeking access to the system (for example, via the Internet) by comparing a user provided user name and password against a list of authorized list of user names and passwords. Preferably a "firewall" is also present between authenticated users and the application server to allow passage of only certain types of data packet transmissions (such as, for example, http or https).

The application software receives electronic document versions submitted by authenticated users and assigns version identifiers associated with those document versions. The application software communicates with a database server and associated software (such as, for example, Microsoft SQL Server) for storage of these electronic document versions and related version identifiers. The application software and database server software may be installed on one computer or on different computers. For purposes of this application, "database" includes the computer-readable media and associated processors necessary to index and store electronic document files on one or more computers. As shown in FIG. 2, electronic documents received by the application software are stored in the database, together with the associated document version identifiers. Authenticated users may retrieve electronic document versions from the database.

In the most important step of the present invention, authenticated users may select a specific document version for "finalization." The application software modifies the selected file using a ".NET" object to convert the document to a non-alterable format and adds a verification code to that document. The finalization step may be commenced by any authenticated user, or alternatively only by certain authenticated users. Where the document exchange system provides greater control rights to specific users (often called "administrators") the present invention could provide that only these administrators, or alternatively an administrator from each party to the transaction, have the ability to "finalize" a document. As described above, the "finalization" step, represented by the "Modify Document" step in FIG. 2, involves the creation of a non-alterable document with a verification code added. The verification code may be added prior to the creation of the non-alterable document or after creation of the non-alterable document. "Non-alterable document" means a document that, once opened by a user can not be modified by that user or another authenticated user.

After a user has identified a document version for finalization, a warning screen should be presented confirming that the user wishes to "finalize" the document. The system would ideally permit the finalization of only one version, but as an alternative if a second version is later "finalized" the previously finalized version could be again modified to include text (like "Superseded") to reflect that a different version had been subsequently finalized. In this case the second finalized version could include a modified verification code with text like "Revised Final Document."

Ideally the finalization of one version would "lock" the database and prevent further posting of additional versions of that document. Alternatively, selected users could be given the authority to unlock the database after finalization to permit the posting of additional versions.

Preferably the verification code comprises the logo of the independent provider of the document exchange system, the words "Final Document," the date of finalization, and a global unique identifier (GUID). The total size of the verification code should be approximately one half (½) inch high and one and one-half to two (1½ to 2) inches long. The verification code visibly appears in the document, whether the document is viewed on a display screen or printed.

The modified document, with verification code and in a non-alterable format, is added to the database and is available for retrieval by authenticated users as another version of the document.

Figure 3:
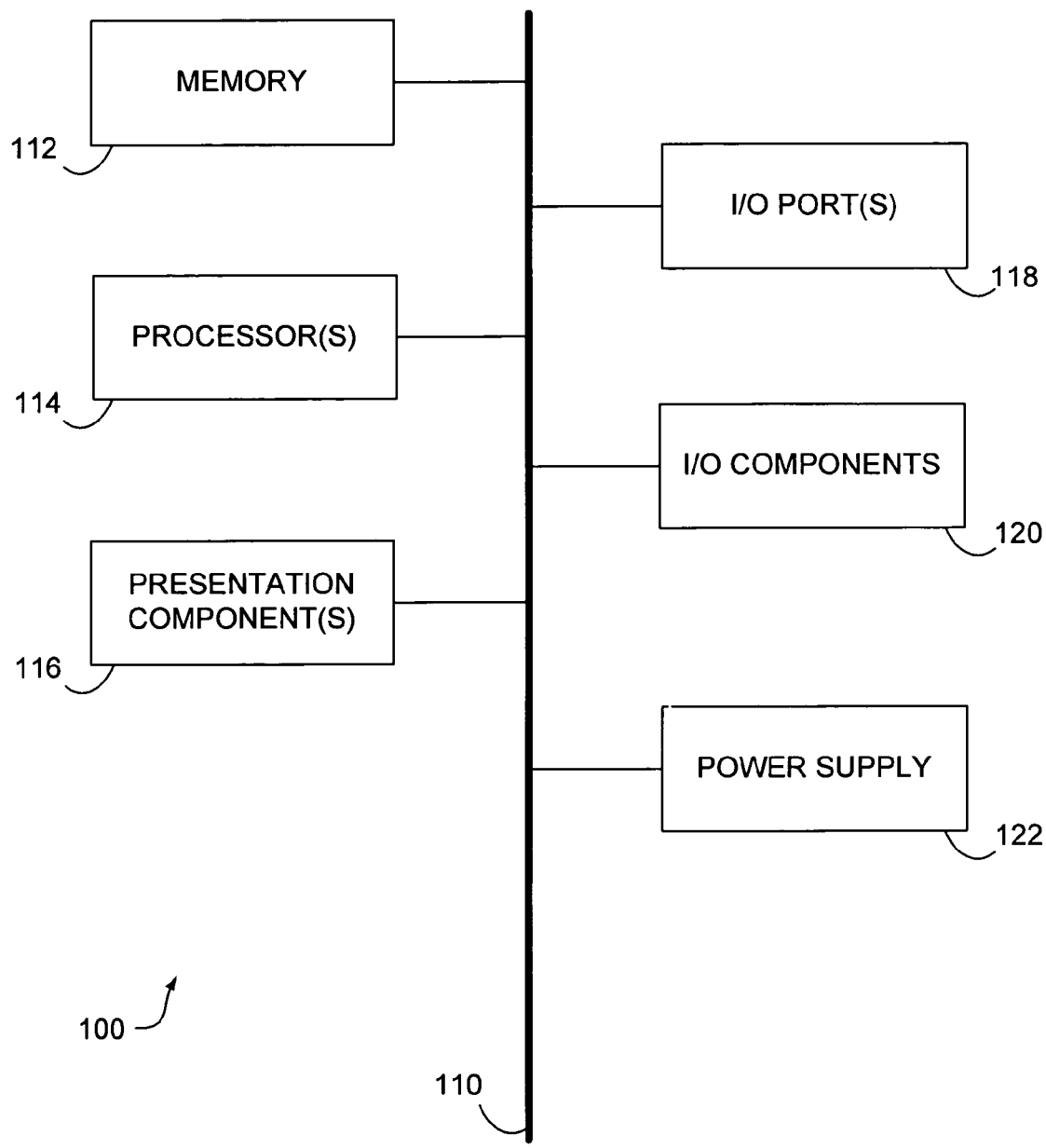
FIG. 3 is a diagram showing an exemplary operating environment suitable for implementing embodiments of the present invention.

Referring to FIG. 3, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 3, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 3 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 3 is merely illustrative of an exemplary computing device that can be used in connection with one or more embodiments. Distinction is not made between such categories as "workstation," "server," "laptop," "hand-held device," etc., as all are contemplated within the scope of FIG. 3 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other physical medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

I claim:

1. A method for creating a business transaction document with a verification code, the method comprising:
   receiving authentication requests from one or more users to access a database for storing electronic document versions;
   authenticating one or more users to control access to the database;
   receiving a plurality of versions of an electronic document from a plurality of authenticated users for storage in the database;
   associating a version identifier with each electronic document version received into the database;
   storing the electronic document versions and the associated version identifiers in the database;
   receiving a selection from an authenticated user to select one version from the plurality of versions of the electronic document for finalization;
   creating a non-alterable final document equivalent to the selected document version with a verification code added to the selected document version;
   storing the non-alterable final document in the database; and
   preventing receipt of additional documents or document versions after the non-alterable final document has been stored in the database.

2. The method of claim 1 further comprising the step of providing a listing of document versions from which users may select the version for finalization.

3. The method of claim 1 further comprising the step of permitting authenticated users to retrieve document versions including said non-alterable final document from the database.

4. The method of claim 1 wherein the verification code appears on each page of a printed copy of the non-alterable final document.

5. The method of claim 2 wherein the verification code appears on each page of a printed copy of the non-alterable final document.

6. The method of claim 1, wherein not all authenticated users are permitted to select one version of the electronic documents for finalization.

7. One or more physical computer-readable media having computer-executable instructions embodied thereon for performing a method of creating a business transaction document with a verification code, the method comprising:
   receiving authentication requests from one or more users to access a database for storing electronic document versions;
   authenticating one or more users to control access to the database;
   receiving a plurality of versions of an electronic document into the database from a plurality of authenticated users for storage in a database;
   associating a version identifier with each electronic document version received into the database;
   storing the electronic document versions and the associated version identifiers in the database;
   receiving a selection from an authenticated user to select one version from the plurality of versions of the electronic document for finalization;
   adding verification code to the selected document version wherein the verification code appears on a printed copy of the document;
   creating a non-alterable final document equivalent to the selected document version with a verification code added to the selected document version;
   storing the non-alterable final document in the database; and
   preventing receipt of additional document versions after the non-alterable final document has been stored in the database.

8. The physical computer-readable media in claim 7 further carrying out the step of providing a listing of document versions from which users may select the version for finalization.

9. The physical computer-readable media in claim 7 further carrying out the step of permitting authenticated users to retrieve document versions including said non-alterable final document from the database.

10. The physical computer-readable media claim 7 wherein the verification code appears on each page of a printed copy of the non-alterable final document.

11. The physical computer-readable media in claim 8 wherein the verification code appears on each page of a printed copy of the non-alterable final document.

12. The physical computer-readable media in claim 7 wherein not all authenticated users are permitted to select one version of the electronic documents for finalization.

13. The method of claim 1 wherein the electronic document version selected for finalization is the version most recently stored in the database.

14. One or more physical computer-readable media having computer-executable instructions embodied thereon for performing a method of creating a business transaction document with a verification code, the computer-executable instructions comprising:
   a code segment for receiving authentication requests from a plurality of users to access a database for storing electronic document versions;
   a code segment for authenticating a plurality of the users to control access to the database;
   a code segment for receiving a first alterable electronic document from a first one of the one or more authenticated users for storage in the database;

a code segment for associating a first version identifier with the first alterable electronic document received into the database;

a code segment for storing the first alterable electronic document and the associated first version identifier in the database;

a code segment for retrieving the first alterable electronic document to be edited by one or more of a second one of the authenticated users;

a code segment for receiving a second alterable electronic document which is an edited version of the first alterable electronic document as edited by the second one of the authenticated users;

a code segment for associating a second version identifier with the second alterable electronic document received into the database;

a code segment for storing the second alterable electronic document and associated second version identifier in the database;

a code segment for receiving a selection from one of the authenticated users to select one version from multiple versions of the electronic document stored in the database for finalization, wherein the multiple versions of the electronic document include the first alterable electronic document and the second alterable electronic document;

a code segment for creating a non-alterable final document equivalent to the selected document version with a verification code added to the selected document version;

a code segment for storing the non-alterable final document in the database; and a code segment for preventing receipt and storage of additional documents by the database after the non-alterable final document has been stored in the database.

15. The method of claim 14, further comprising:

a code segment for retrieving one of the first alterable electronic document and the second alterable electronic document to be edited by one or more of the authenticated users;

a code segment for receiving a third alterable electronic document, which is an edited version of one of the first alterable electronic document and the second alterable electronic document;

a code segment for associating a third version identifier with the third alterable electronic document received into the database; and a code segment for storing the third alterable electronic document and associated second version identifier in the database, wherein the multiple versions of the electronic document include the third alterable electronic document.

16. The method of claim 14, wherein the selected document version is not the most-recently stored version.

17. The method of claim 14, wherein the selected document version is the most-recently stored version.

* * * * *